(12) United States Patent
Rog et al.

(10) Patent No.: US 9,042,493 B2
(45) Date of Patent: May 26, 2015

(54) METHOD AND APPARATUS FOR ITERATIVELY DETECTING AND DECODING SIGNAL IN COMMUNICATION SYSTEM WITH MULTIPLE-INPUT AND MULTIPLE-OUT (MIMO) CHANNEL

(71) Applicant: SAMSUNG ELECTRONICS CO., LTD., Suwon-si (KR)

(72) Inventors: Andrey Leonidovich Rog, Moscow (RU); Alexei Olegovich Melnikov, Moscow (RU); Michael Vladimirovich Golikov, Moscow (RU); Vitaliy Borisovich Kreyndelin, Moscow (RU); Mikhail Germanovich Bakulin, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/090,720

(22) Filed: Nov. 26, 2013

(65) Prior Publication Data
US 2014/0146925 A1 May 29, 2014

(30) Foreign Application Priority Data

Nov. 27, 2012 (RU) .................................. 2012150727
Oct. 16, 2013 (KR) ......................... 10-2013-0123202

(51) Int. Cl.
*H04L 27/06* (2006.01)
*H04L 25/03* (2006.01)
*H04L 1/00* (2006.01)
*H04B 7/06* (2006.01)
*H04B 7/08* (2006.01)

(52) U.S. Cl.
CPC ..... *H04L 25/03171* (2013.01); *H04L 25/03178* (2013.01); *H04L 1/005* (2013.01); *H04L 25/03891* (2013.01); *H04L 2025/0342* (2013.01); *H04B 7/0697* (2013.01); *H04B 7/0854* (2013.01)

(58) Field of Classification Search
CPC .............. H04L 1/005; H04L 25/03171; H04L 25/03178; H04L 27/2647; H04L 2025/0342; H04B 7/0697; H04B 7/0854
USPC ................ 375/261–262, 285, 340–341, 346, 375/324–325
See application file for complete search history.

(56) References Cited

U.S. PATENT DOCUMENTS

| | | | |
|---|---|---|---|
| 6,662,337 B1 * | 12/2003 | Brink | 714/792 |
| 8,514,984 B2 * | 8/2013 | Tang et al. | 375/341 |
| 8,737,539 B2 * | 5/2014 | Koshy | 375/340 |

(Continued)

*Primary Examiner* — Jean B Corrielus
(74) *Attorney, Agent, or Firm* — NSIP Law

(57) ABSTRACT

A communication apparatus with a multiple-input and multiple-output (MIMO) channel, includes a minimum mean square error (MMSE) detector configured to estimate quadrature amplitude modulation (QAM) symbols based on signals received through the MIMO channel. The apparatus further includes a QAM demodulator configured to demodulate the estimated QAM symbols, and estimate a first posterior probability of each of encoded bits of the estimated QAM symbols, and a first module configured to remove a first prior probability of each of the encoded bits from the first posterior probability to generate soft estimates of the encoded bits. The apparatus further includes a channel decoder configured to decode the encoded bits based on the soft estimates, and generate an improved posterior probability of each of the encoded bits, and a second module configured to generate a second prior probability of each of the encoded bits based on the improved posterior probability.

16 Claims, 8 Drawing Sheets

(56) References Cited

U.S. PATENT DOCUMENTS

| | | | |
|---|---|---|---|
| 2006/0159160 A1* | 7/2006 | Kim et al. | 375/148 |
| 2007/0041475 A1* | 2/2007 | Koshy et al. | 375/340 |
| 2007/0136648 A1* | 6/2007 | Kwon et al. | 714/794 |
| 2007/0223618 A1* | 9/2007 | Jeong et al. | 375/267 |
| 2008/0310556 A1* | 12/2008 | Lee et al. | 375/340 |
| 2009/0122897 A1* | 5/2009 | Belogolovy et al. | 375/267 |
| 2009/0141826 A1* | 6/2009 | Suzuki et al. | 375/295 |
| 2013/0297996 A1* | 11/2013 | Wilborn et al. | 714/807 |

* cited by examiner

METHOD AND APPARATUS FOR ITERATIVELY DETECTING AND DECODING SIGNAL IN COMMUNICATION SYSTEM WITH MULTIPLE-INPUT AND MULTIPLE-OUT (MIMO) CHANNEL

CROSS-REFERENCE TO RELATED APPLICATION

This application claims the benefit under 35 USC 119(a) of Russian Patent Application No. 2012150727, filed on Nov. 27, 2012, in the Russian Federal Service for Intellectual Property, and Korean Patent Application No. 10-2013-0123202, filed on Oct. 16, 2013, in the Korean Intellectual Property Office, the entire disclosures of which are incorporated herein by reference for all purposes.

BACKGROUND

1. Field

The following description relates to a method and an apparatus for iteratively detecting and decoding a signal in a communication system with a multiple-input and multiple-output (MIMO) channel.

2. Description of Related Art

Multiple-input and multiple-output (MIMO) refers to a smart antenna technology that enhances a capacity for wireless communication. MIMO systems have been developed in a field of wireless communication systems.

In MIMO systems, a plurality of antennas may be used in a base station and/or a terminal, and accordingly, a capacity may be increased in proportion to a number of the used antennas. MIMO systems may parallel transmit signals through a plurality of various channels in the same frequency band. Due to parallel transmission of signals, MIMO systems may demonstrate an extremely high spectral efficiency.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication apparatus with a multiple-input and multiple-output (MIMO) channel, includes a minimum mean square error (MMSE) detector configured to estimate quadrature amplitude modulation (QAM) symbols based on signals received through the MIMO channel. The apparatus further includes a QAM demodulator configured to demodulate the estimated QAM symbols, and estimate a first posterior probability of each of encoded bits of the estimated QAM symbols, and a first module configured to remove a first prior probability of each of the encoded bits from the first posterior probability to generate soft estimates of the encoded bits. The apparatus further includes a channel decoder configured to decode the encoded bits based on the soft estimates, and generate an improved posterior probability of each of the encoded bits, and a second module configured to generate a second prior probability of each of the encoded bits based on the improved posterior probability, the second prior probability being a first prior probability of each of encoded bits of QAM symbols in a next iteration cycle. The apparatus further includes a hard-decision estimator configured to generate a sequence of hard estimates of information bits based on the improved posterior probability.

The first posterior probability may include a logarithm ratio of posterior probabilities of each of the encoded bits, and the first prior probability may include a logarithm ratio of prior probabilities of each of the encoded bits.

The first prior probability may include a natural logarithm of a value obtained by dividing a probability that a k-th encoded bit in an n-th QAM symbol is 1, by a probability that the k-th encoded bit in the n-th QAM symbol is −1, and n may be an integer that is greater than or equal to 1, and less than or equal to N. k may be an integer that is greater than or equal to 1, and less than or equal to K, N may denote a number of the QAM symbols, and K may denote a number of bits in each of the QAM symbols.

The improved posterior probability may include a logarithm ratio of improved posterior probabilities of each of the encoded bits, and the second module may be configured to remove the soft estimates from the improved posterior probability to generate the second prior probability. In response to the improved posterior probability being generated at least one time, the first module may be further configured to generate soft estimates of the encoded bits in the next iteration cycle based on the second prior probability as the first prior probability in the next iteration cycle.

The communication apparatus may further include a remodulator configured to generate a first mathematical expectation and a first variance of the QAM symbols based on the improved posterior probability, and a third module configured to compare the first variance with a third variance generated after estimation of QAM symbols in a previous iteration cycle, and generate input parameters of the MMSE detector based on a result of the comparing.

The input parameters may include a second mathematical expectation and a second variance of the QAM symbols, and a third mathematical expectation may be generated after the estimation of the QAM symbols in the previous iteration cycle. In response to the first variance being less than the third variance, the third module may be configured to generate the second mathematical expectation based on the first mathematical expectation, the first variance, the third mathematical expectation, and the third variance, and generate the second variance based on the first variance and the third variance. In response to the first variance being greater than or equal to the third variance, the third module may be configured to generate the second mathematical expectation and the second variance in a current iteration cycle, as a second mathematical expectation and a second variance of QAM symbols in the previous iteration cycle.

The MMSE detector may be configured to apply an MMSE linear filter to a symbol vector of the QAM symbols to generate an MMSE estimation mathematical expectation and an MMSE estimation variance of the symbol vector, generate a third mathematical expectation to be used in the next iteration cycle, based on the second mathematical expectation, the second variance, the MMSE estimation mathematical expectation, and the MMSE estimation variance, generate a third variance to be used in the next iteration cycle, based on the second variance and the MMSE estimation variance, and estimate QAM symbols in the next iteration cycle in response to the third mathematical expectation and the third variance being generated. The third mathematical expectation and the third variance to be used in the next iteration cycle may be input to the QAM demodulator in the next iteration cycle.

The QAM demodulator may be further configured to estimate a first posterior probability of each of the encoded bits in the next iteration cycle based on the third mathematical expectation and the third variance to be used in the next iteration cycle.

In response to the third mathematical expectation and the third variance being initially generated, the third module may be configured to set the second mathematical expectation to 0, and set the second variance to a unit variance.

The communication apparatus may further include a deinterleaver configured to deinterleave the encoded bits before the encoded bits are input to the channel decoder, and an interleaver configured to interleave soft bits output from the channel decoder.

In another general aspect, a method in a communication apparatus with a multiple-input and multiple-output (MIMO) channel, includes estimating quadrature amplitude modulation (QAM) symbols based on signals received through the MIMO channel. The method further includes demodulating the estimated QAM symbols, and estimating a first posterior probability of each of encoded bits of the estimated QAM symbols. The method further includes removing a first prior probability of each of the encoded bits from the first posterior probability to generate soft estimates of the encoded bits, and decoding the encoded bits based on the soft estimates. The method further includes generating an improved posterior probability of each of the encoded bits, and generating a second prior probability of each of the encoded bits based on the improved posterior probability, the second prior probability being a first prior probability of each of encoded bits of QAM symbols in a next iteration cycle. The method further includes generating a sequence of hard estimates of information bits based on the improved posterior probability.

The generating of the second prior probability may include removing the soft estimates from the improved posterior probability to generate the second prior probability. The method may further include, in response to the improved posterior probability being generated at least one time, generating soft estimates of the encoded bits in the next iteration cycle based on the second prior probability as the first prior probability in the next iteration cycle.

The method may further include generating a first mathematical expectation and a first variance of the QAM symbols based on the improved posterior probability, and comparing the first variance with a third variance generated after estimation of QAM symbols in a previous iteration cycle. The method may further include generating input parameters for estimation of the QAM symbols in the next iteration cycle based on a result of the comparing.

The generating of the input parameters may include, in response to the first variance being less than the third variance, generating the second mathematical expectation based on the first mathematical expectation, the first variance, the third mathematical expectation, and the third variance, and generating the second variance based on the first variance and the third variance, and the generating of the input parameters may include, in response to the first variance being greater than or equal to the third variance, generating the second mathematical expectation and the second variance in a current iteration cycle, as a second mathematical expectation and a second variance of QAM symbols in the previous iteration cycle.

The estimating of the QAM symbols may include applying a minimum mean square error (MMSE) linear filter to a symbol vector of the QAM symbols to generate an MMSE estimation mathematical expectation and an MMSE estimation variance of the symbol vector, and generating a third mathematical expectation to be used in the next iteration cycle, based on the second mathematical expectation, the second variance, the MMSE estimation mathematical expectation, and the MMSE estimation variance. The estimating of the QAM symbols may further include generating a third variance to be used in the next iteration cycle, based on the second variance and the MMSE estimation variance, and estimating QAM symbols in the next iteration cycle in response to the third mathematical expectation and the third variance being generated.

The method may further include estimating a first posterior probability of each of the encoded bits in the next iteration cycle based on the third mathematical expectation and the third variance to be used in the next iteration cycle.

The method may further include, in response to the third mathematical expectation and the third variance being initially generated, setting the second mathematical expectation to 0, and setting the second variance to a unit variance.

In still another general aspect an apparatus includes a processor configured to estimate quadrature amplitude modulation (QAM) symbols based on signals, demodulate the estimated QAM symbols, and estimate a posterior probability of each of encoded bits of the estimated QAM symbols. The processor is further configured to remove a prior probability of each of the encoded bits from the posterior probability to generate soft estimates of the encoded bits, and decode the encoded bits based on the soft estimates.

The processor may be further configured to generate an improved posterior probability of each of the encoded bits, generate another prior probability of each of encoded bits of QAM symbols in a next iteration cycle based on the improved posterior probability, and generate a sequence of hard estimates of information bits based on the improved posterior probability.

The processor may be further configured to generate a first mathematical expectation and a first variance of the QAM symbols based on the improved posterior probability, generate a second mathematical expectation and a second variance of the QAM symbols based on the first mathematical expectation, the first variance, a third mathematical expectation of QAM symbols in a previous iteration cycle, and a third variance of the QAM symbols in the previous iteration cycle, and estimate QAM symbols in the next iteration cycle based on the second mathematical expectation and the second variance.

Other features and aspects will be apparent from the following detailed description, the drawings, and the claims.

Figure 1:
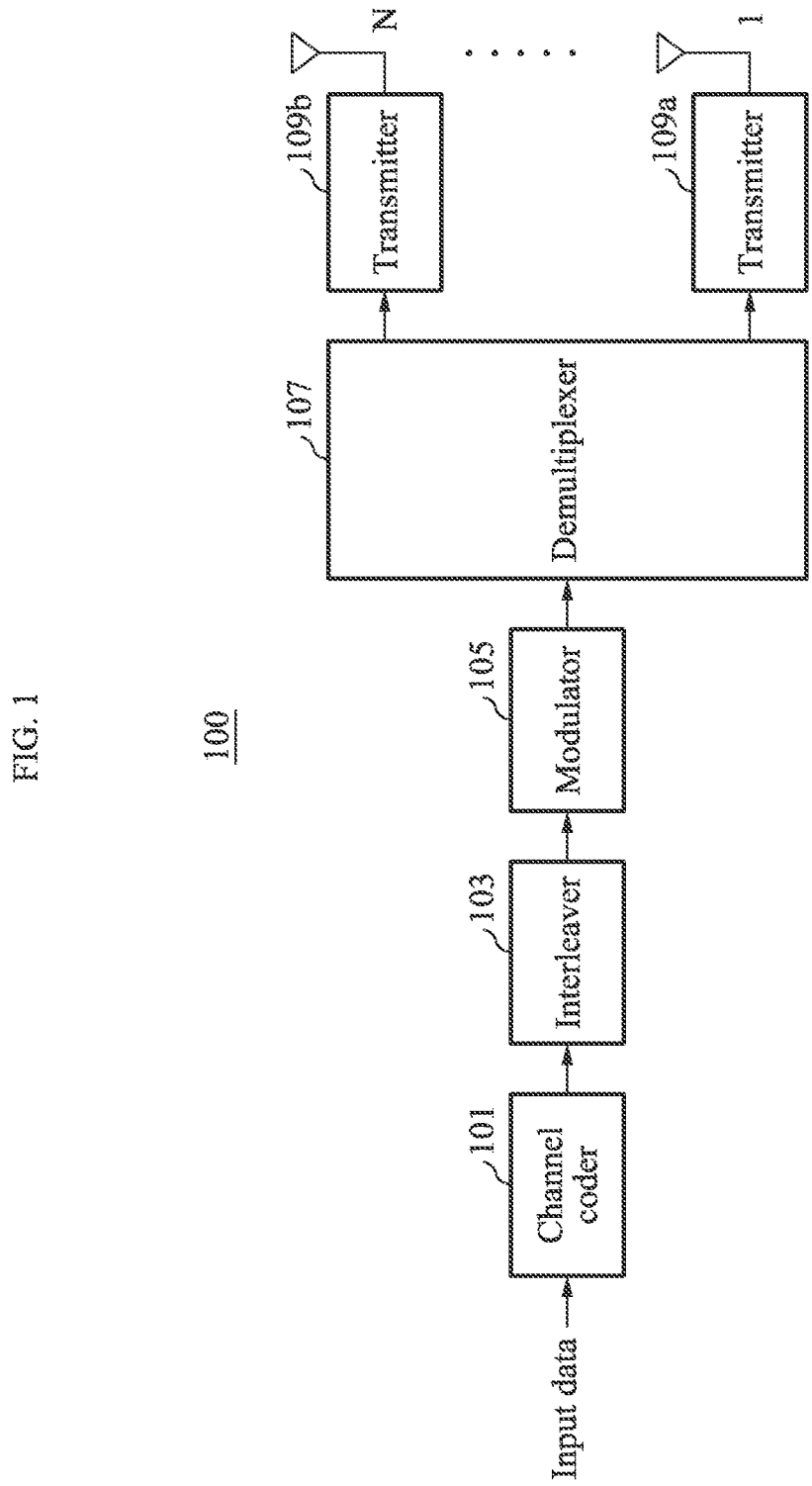
FIG. 1 is a diagram illustrating an example of a transmission apparatus with a multiple-input and multiple-out (MIMO) channel and configured to generate a signal.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various modes to transmit signals by multiple-input and multiple-output (MIMO) may be used. Among the various modes, a Vertical-Bell Laboratories Layered Space-Time (V-BLAST) architecture may be used.

In the V-BLAST architecture known as a spatial multiplexing scheme, a signal may be divided into a plurality of parallel streams. The plurality of parallel streams may be transmitted by a plurality of spatial channels formed between sets of transmitting antennas and receiving antennas.

A MIMO system will be described in a frequency domain by a matrix equation, for example, Equation 1 below.

$$Y = HX + \eta \quad \text{[Equation 1]}$$

In Equation 1, Y denotes an M-dimensional vector of a complex value signal on an input of a MIMO detector, and may be regarded as a vector of output samples of a MIMO channel. Additionally, X denotes an N-dimensional vector of quadrature amplitude modulation (QAM) symbols that are modulated and transmitted in a transmitter, and may be regarded as a vector of input samples of the MIMO channel. $\eta$ denotes a vector of values of complex noise, and H denotes a complex channel matrix of the MIMO channel and has a size of "M×N". Each of M and N may be an integer that is greater than or equal to "1".

When a signal is transmitted using the spatial multiplexing scheme, a mutual interference between different parallel data streams may occur. Accordingly, a task to design efficient methods of signal detection, demodulation and decoding in a condition of an outer noise and mutual interference may occur. A method for signal detection may be a maximum likelihood (ML) method. The ML method may be used to estimate a probability of all possible combinations of symbols. A main drawback of the ML method may be a high complexity that may rise exponentially versus a number of simultaneously transmitted streams. A large number of alternative methods for signal detection due to a mitigation of mutual interference may exist. A method used to mitigate an interference may include, for example, a zero forcing (ZF) method and a minimum mean square error (MMSE) method. The ZF method may be used to minimize a mean interference power in a receiver, and the MMSE method may be used to minimize a mean square error of estimation.

In the MMSE method, Equation 1 may be defined to be Equation 2 below.

$$Y = G_{MMSE}^{-1} \tilde{X}_{MMSE} \quad \text{[Equation 2]}$$

$G_{MMSE}$ may be defined in Equation 3 below.

$$G_{MMSE} = \left( H^H H + \frac{\sigma_\eta^2}{\sigma_s^2} I_N \right)^{-1} H^H \quad \text{[Equation 3]}$$

In Equations 2 and 3, $G_{MMSE}$ denotes an MMSE filter matrix of linear transformation $\sigma_\eta^2$ denotes a noise variance, and $\sigma_s^2$• denotes a mean value of a signal power. Additionally, $I_N$ denotes an identity matrix with a size of "N×N", and "N" may be an integer that is greater than or equal to "1". $\tilde{X}_{MMSE}$ denotes a vector of MMSE estimation of transmitted QAM symbols, and may be an MMSE solution.

The ZF method and the MMSE method may have relatively low realization complexity. However, the ZF method and the MMSE method may demonstrate a significant degradation, compared with the ML method, in an accuracy of estimation of received symbols, and ultimately, in a probability of receiving of incorrect bits in a message (namely, a bit error rate (BER)).

Modern digital communication systems employing a spatial multiplexing scheme may widely propose other methods of transmitting and receiving a signal to improve an efficiency and quality of signal transmission and data transmission. For example, methods of channel encoding of digital data in a transmission device, and methods of decoding of digital data in a receiver may be widely applied in the above methods. Additionally, the methods may use data scrambling and interleaving of data, designated by the term "interleaving". Interleaving may lead to more efficient distribution of transmitted signals in a spatial-time-frequency continuum. The more efficient distribution of transmitted signals may finally improve a quality of data transmission.

In methods of iteratively detecting and decoding a signal, joint detection and decoding may be performed within an iterative process. The above methods may also be called "turbo processing methods".

In a communication system, digital data may be exposed to a coding procedure in a channel coder. In the channel coder, an initial input sequence of information bits may be transformed to an output sequence. The output sequence may include additional parity check bits.

Various types of channel codes may be used in digital communication systems. For example, convolution codes, turbo codes, and low density parity check (LDPC) codes may be widely, practically applied.

After encoding, data may be interleaved, may be modulated, may be spatially de-multiplexed, may be transformed from a digital signal to an analog signal, may be frequency-converted, may be amplified, and may be spatially transmitted by a plurality of antennas of a transmitter.

FIG. 1 illustrates an example of a transmission apparatus 100 with a MIMO channel and configured to generate a signal. FIG. 1 illustrates an example of signal generation in a system with the MIMO channel.

In FIG. 1, the transmission apparatus 100 includes a channel coder 101, an interleaver 103, a modulator 105, a demultiplexer 107, and a plurality of transmitters, namely, "N" transmitters. The plurality of transmitters may include, for example, transmitters 109a and 109b. "N" denotes a number of the transmitters, and may be an integer that is greater than or equal to "2".

Input data may be bits, for example, input information bits.

The channel coder 101 encodes the input information bits to generate the encoded bits. That is, the channel coder 101 transforms the input information bits to the encoded bits.

The interleaver 103 interleaves the encoded bits to generate the interleaved bits.

The modulator 105 modulates the interleaved bits to generate modulated data. The modulator 105 may be, for example, a mapper.

The demultiplexer 107 demultiplexes the modulated data to split the modulated data into a plurality of spatial streams.

Each of the plurality of transmitters may transform each of the plurality of spatial streams to an analog signal. Each of the plurality of transmitters may convert a carrier frequency of the analog signal, and may amplify the analog signal. After the transforming, the converting, and the amplifying, each of the plurality of transmitters may transmit analog signals of the respective plurality of spatial streams.

Hereinafter, a reception apparatus corresponding to the transmission apparatus 100 of FIG. 1 will be further described with reference to FIG. 2.

Figure 2:
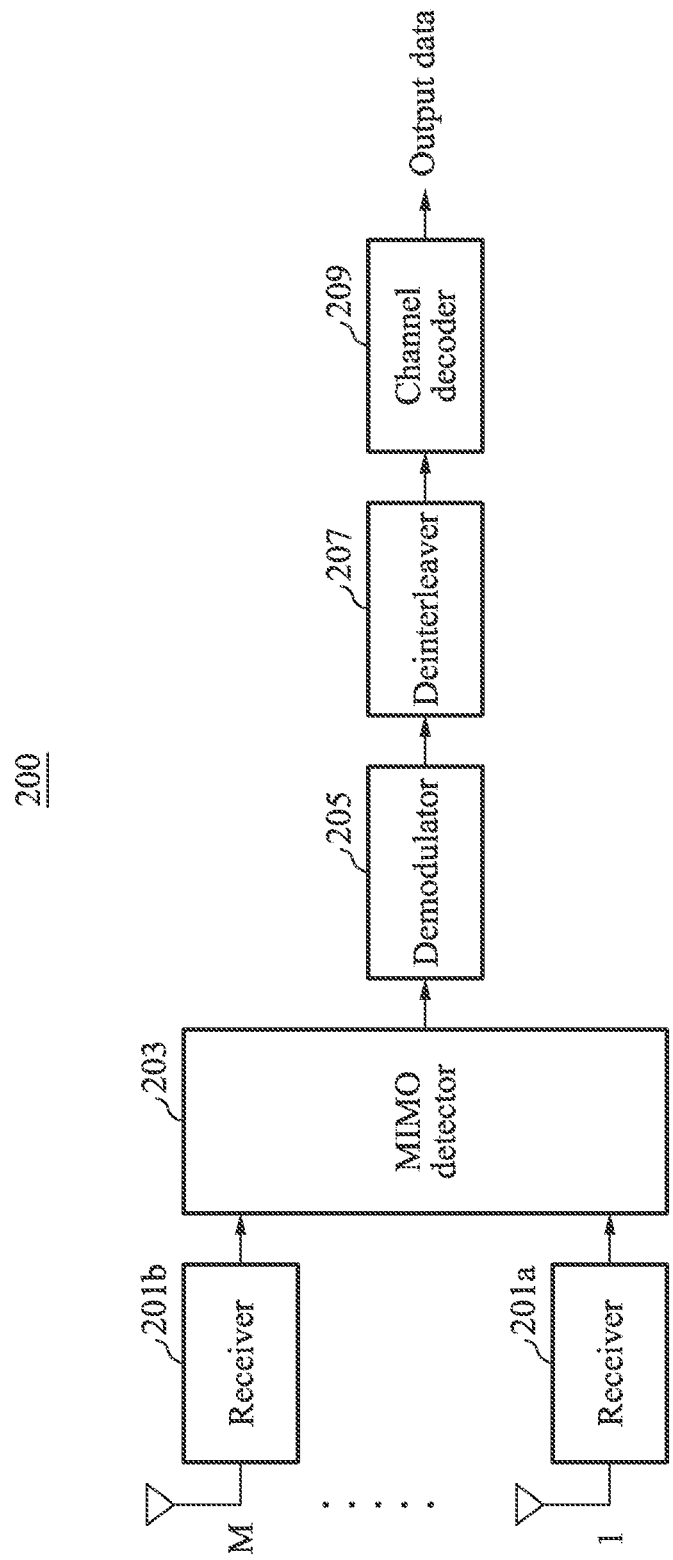
FIG. 2 is a diagram illustrating an example of a reception apparatus with a MIMO channel.

FIG. 2 illustrates an example of a reception apparatus 200 with a MIMO channel. FIG. 2 illustrates an example of signal reception in the reception apparatus 200 with the MIMO channel.

In FIG. 2, the reception apparatus 200 includes a plurality of receivers, a MIMO detector 203, a demodulator 205, a deinterleaver 207, and a channel decoder 209. The plurality of receivers may include, for example, receivers 201a and 201b. The plurality of receivers may be "M" receivers, and "M" may be an integer that is greater than or equal to "2".

Each of the plurality of receivers may receive each of transmitted signals. Each of the plurality of receivers may amplify the received signals, may transform the received signals, using a carrier frequency, may filter the received signals, and may transform the received signals to digital signals. The receiving, the amplifying, the transforming using the carrier frequency, the filtering, and the transforming to digital signals may be sequentially performed on each of the transmitted signals in a corresponding receiver.

The digital signals output from the plurality of receivers may be transmitted to the MIMO detector 203. The MIMO detector 203 performs preliminary MIMO detection of the digital signals, and outputs the digital signals. The MIMO detector 203 may detect a multidimensional input signal from the digital signals.

The demodulator 205 demodulates the digital signals processed by the MIMO detector 203, to generate the demodulated digital signals.

The deinterleaver 207 deinterleaves the demodulated digital signals to generate the deinterleaved digital signals.

The channel decoder 209 decodes the deinterleaved digital signals to generate output data.

The output data may correspond to the input data and the input information bits of FIG. 1. The deinterleaved digital signals may correspond to the encoded bits of FIG. 1. The demodulated digital signals may correspond to the interleaved bits of FIG. 1. The digital signals output from the MIMO detector 203 may correspond to the modulated data of FIG. 1. The digital signals output from the plurality of receivers may correspond to the plurality of spatial streams of FIG. 1. The transmitted signals received by the plurality of receivers may correspond to the analog signals transmitted by the plurality of transmitters of FIG. 1.

Figure 3:
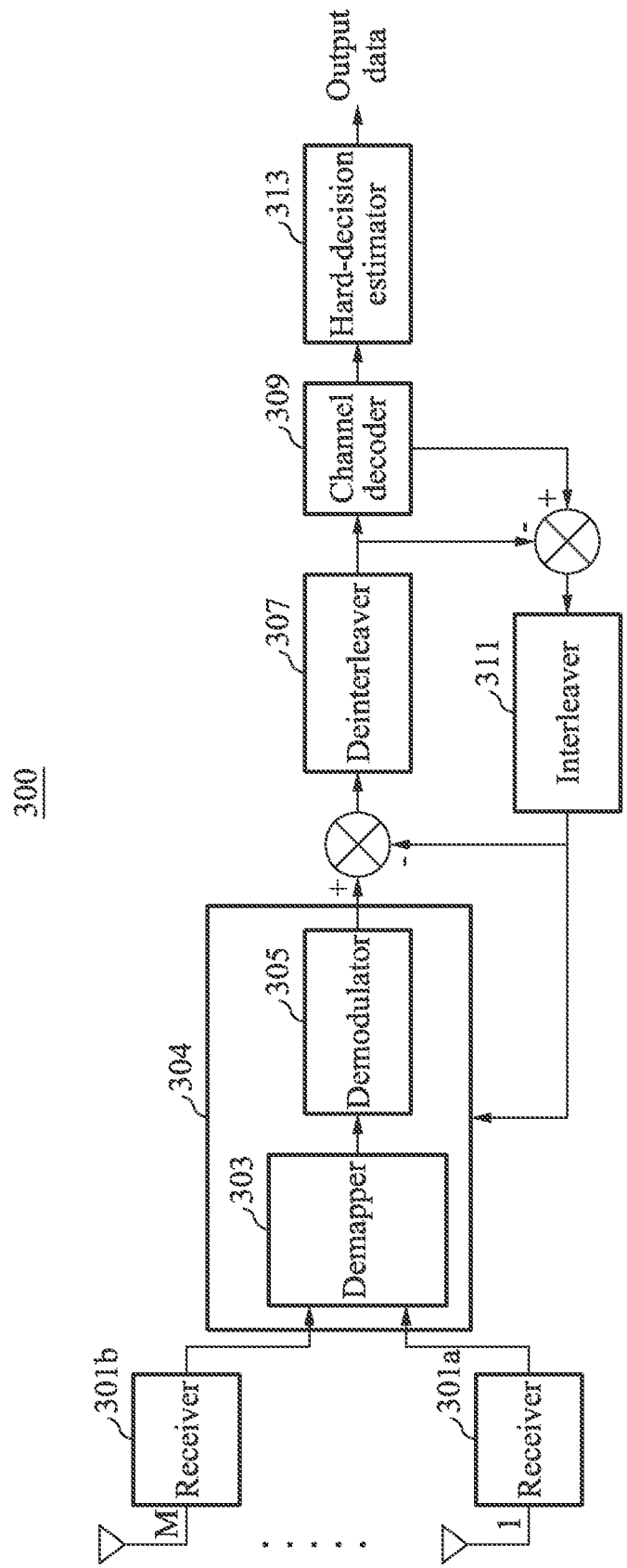
FIG. 3 is a diagram illustrating an example of a reception apparatus configured to perform iterative detection and decoding a signal.

FIG. 3 illustrates an example of a reception apparatus 300 configured to perform iterative detection and decoding of a signal. The reception apparatus 300 of FIG. 3 performs the iterative detection and decoding in a system with a MIMO channel.

The reception apparatus 300 may correspond to the reception apparatus 200 of FIG. 2. In the reception apparatuses 300 and 200, elements with same or similar names may perform same or similar functions.

Referring to FIG. 3, the reception apparatus 300 includes a plurality of receivers, a MIMO detector 304, a deinterleaver 307, a channel decoder 309, an interleaver 311, and a hard-decision estimator 313. The MIMO detector 304 includes a demapper 303 and a demodulator 305. The plurality of receivers may include, for example, receivers 301a and 301b. The plurality of receivers may be "M" receivers, and "M" may be an integer that is greater than or equal to "2".

Each of the plurality of receivers may receive each of transmitted signals. Each of the plurality of receivers may amplify the received signals, may transform the received signals, using a carrier frequency, may filter the received signals, and may transform the received signals to digital signals. The receiving, the amplifying, the transforming using the carrier frequency, the filtering, and the transforming to digital signals may be sequentially performed on each of the transmitted signals in a corresponding receiver.

The digital signals output from the plurality of receivers may be transmitted to the demapper 303 of the MIMO detector 304. The MIMO detector 304 (e.g., the demapper 303) may detect a multidimensional input signal from the digital signals.

The demapper 303 receives, together with the digital signals, prior information of encoded bits, namely, QAM symbols including the encoded bits. The prior information is output from the interleaver 311. The prior information may include a prior probability of the encoded bits. The encoded bits after estimation of a probability of the encoded bits, namely, a logarithm ratio of posterior probabilities, may be called soft bits.

The demodulator 305 demodulates the detected multidimensional input signal to generate encoded bits. The demodulator 305 performs a first estimation of a probability of the encoded bits. The demodulator 305 may perform the first estimation, using a logarithm likelihood ratio (LLR) or a logarithm ratio of posterior probabilities.

In an example, the MIMO detector 304 and the demodulator 305 may be closely integrated. The MIMO detector 304 and the demodulator 305 may be combined in a joint module, namely, the demapper 303.

The soft bits are input to the deinterleaver 307. The deinterleaver 307 deinterleaves the soft bits to generate the deinterleaved soft bits. The deinterleaved soft bits are input to the channel decoder 309.

The channel decoder 309 estimates a posterior probability of information bits, namely, a logarithm ratio of posterior probabilities. The information bits are output via a first output, namely, a main output, of the channel decoder 309, based on parameters of a used code. For example, the channel decoder 309 may generate soft estimates of the information bits.

Additionally, the channel decoder 309 improves values of probabilities of encoded bits output via a second output of the channel decoder 309. For example, the channel decoder 309 may generate improved soft estimates of the encoded bits.

The first output of the channel decoder 309 may include the soft estimates of the information bits. The hard-decision estimator 313 transforms the soft estimates of the information bits to hard estimates of the information bits, to generate output data. An output of the hard-decision estimator 313 may be a common output of a communication apparatus with a MIMO channel.

The second output of the channel decoder 309 may include the improved soft estimates of the encoded bits. When the improved soft estimates of the encoded bits are removed from information existing in a form of soft estimates of the encoded bits included in an input of the channel decoder 309, the interleaver 311 interleaves the improved soft estimates of the encoded bits. The interleaved soft estimates are output to an auxiliary input of the MIMO detector 304 as the prior information for a next iteration.

In an example in which a spherical detection method is used, the prior information may be input to the MIMO detector 304, to reduce a number of symbols-candidates participating in computation of posterior information. In another example in which an ML detector is used, prior information may be input to the demodulator 305.

In the next iteration, the MIMO detector 304 and the demodulator 305 generate a new estimate of a posterior probability of the encoded bits, namely, a logarithm ratio of posterior probabilities. When the prior information, namely, a prior logarithm ratio of prior probabilities is removed from the new estimate, the deinterleaver 307 deinterleaves the new estimate from which the prior information is removed. The channel decoder 309 decodes the deinterleaved new estimate. The new estimate may be deinterleaved and decoded one more time. Repeating an iterative procedure of detection by the MIMO detector 304 through decoding by the channel decoder 309 may lead to improving a reliability of estimates of encoded bits. By improving the reliability, a final sequence of hard estimates of the information bits may be matched to a transmitted sequence with a higher probability. The final sequence may correspond to the output data of the reception apparatus 300. The output data of the reception apparatus 300 may correspond to the input data of the transmission apparatus 100 of FIG. 1.

To iteratively perform detection and decoding of a signal in a transmission apparatus with a MIMO channel and a reception apparatus with a MIMO channel, at least one method may be used. Various methods for iterative detection and decoding of a signal may be chosen as a prototype of examples.

A scheme of receiving and processing a signal may correspond to a scheme of FIG. 3. Accordingly, when processing is performed by the MIMO detector 304, a posterior probability may be estimated based on an ML algorithm of Equation 4.

$$L(b_{n,k}) = \ln\left(\frac{\sum_{x:f(b_{n,k}=1)} \prod_{m=1}^{M} \exp(\beta_m) \prod_{p=1}^{N} \prod_{\substack{t=1 \\ t \neq k \text{ when } p=n}}^{K} Pr(b_{p,t})}{\sum_{x:f(b_{n,k}=-1)} \prod_{m=1}^{M} \exp(\beta_m) \prod_{p=1}^{N} \prod_{\substack{t=1 \\ t \neq k \text{ when } p=n}}^{K} Pr(b_{p,t})}\right) + \ln\left(\frac{Pr(b_{n,k}) = +1}{Pr(b_{n,k}) = -1}\right)$$ [Equation 4]

In Equation 4, $L(b_{n,k})$ denotes an LLR value. "n" may be a value that is greater than or equal to "1" and less than or equal to "N", and "k" may be a value that is greater than or equal to "1" and less than or equal to "K". "K" denotes a number of bits in a QAM symbol defined by a constellation $x:f(b_1, \ldots b_K)$. Summing for the constellation may be performed through all possible combinations of symbols. The constellation may include a bit that is equal to "+1" or "−1". "+1" and "−1" may correspond to initial bit values "0" and "1", respectively. A second summand in Equation 4 is a logarithm ratio of prior probabilities. Additionally, $\beta_m$ denotes an Euclidian distance value for each receiving antenna.

$\beta_m$ may be defined in Equation 5 below. In Equation 5, "m" denotes a number of receiving antennas, and may have a value that is greater than or equal to "1" and less than or equal to "N". $\beta_m$ denotes the Euclidian distance value for an m-th receiving antenna.

$$\beta_m = \frac{1}{2\sigma_\eta^2} \|Y_m - H_m X\|^2$$ [Equation 5]

A number of possible symbols engaged in calculation of $L(b_k)$ may be exponentially increased with regard to a number of transmitting antennas, namely, $2^{M*q}$ transmitting antennas, and accordingly, the above-described approach may be unfeasible.

MIMO detection may be performed using a procedure of interference mitigation. A simplified procedure of the MIMO detection using a conventional interference mitigation may be used. Multiplying a vector Y left by a matrix $Q_m$ with a size of "(M−N+1)×N" may be used. By multiplying the left vector Y, all transmitted symbols, namely, symbols transmitted from all transmitting antennas, may be zero, except a single symbol.

As a result of calculation of an LLR, only calculating "(M−N+1)×K" Euclidian distances may be needed. In an example in which a value of M is identical to a value of N, that is, a number of transmitting antennas is equal to a number of receiving antennas, the proposed approach may match a ZF method. The ZF method may exhibit a significant degradation in performance, compared to an approach using the ML detector, and may lose another rather simple method of linear filtration of an MMSE input signal.

In the following description, a signal may be iteratively detected and decoded in communication apparatuses with MIMO channels. A communication apparatus with a MIMO channel may possess improved receiving characteristics. The communication apparatus with the MIMO channel may provide lower BERs for decoded information bits, and may have a complexity that is closer to a simple sum of a complexity of MIMO detection of MMSE and a complexity of channel decoding used separately. The communication apparatus with the MIMO channel may have a complexity without feedback, used in an iterative process.

In the following description, a communication apparatus with a MIMO channel that achieves the above-described technical result will be further described.

Figure 4:
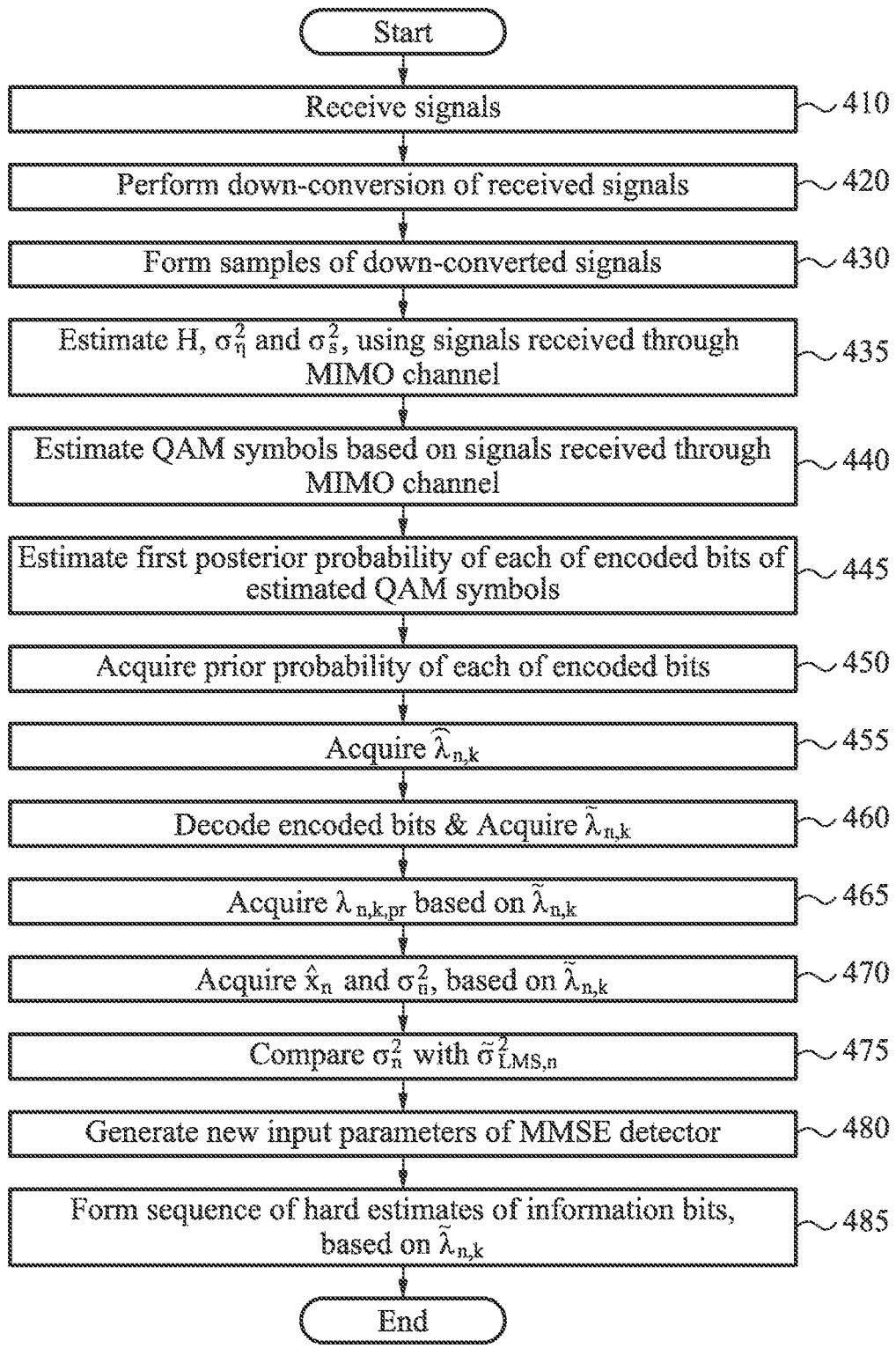
FIG. 4 is a flowchart illustrating an example of a method of iteratively detecting and decoding a signal in a communication apparatus with a MIMO channel.

FIG. 4 illustrates an example of a method of iteratively detecting and decoding a signal in a communication apparatus with a MIMO channel. Referring to FIG. 4, in operation 410, each of a plurality of receiving antennas receives signals. For example, signals modified by transmitted QAM symbols may be received.

In operation 420, each of the plurality of receiving antennas perform down-conversion of the received signals. The down-conversion may be to a zero carrier frequency. The plurality of receiving antennas generate the down-converted signals through the down-conversion.

In operation 430, an MMSE detector forms samples of the down-converted signals. For example, through quantization and digitization, the MMSE detector may form the samples of the down-converted signals. The samples of the down-converted signals may be regarded as signals passing through the MIMO channel. The samples of the down-converted signals may be defined based on Equation 6 below.

$$Y = HX + \eta \quad \text{[Equation 6]}$$

In Equation 6, Y denotes an M-dimensional vector of a signal passing through the MIMO channel, and X denotes an N-dimensional vector of a signal input to the MIMO channel. $\eta$ denotes an M-dimensional vector of noise samples, and H denotes a MIMO channel matrix with a size of "M×N". A sampling frequency may be assumed to be equal to a repetition frequency of QAM symbols, and accordingly, the vector of the signal input to the MIMO channel may be a vector of the transmitted QAM symbols.

In operation 435, the MMSE detector estimates the MIMO channel matrix H, a noise variance $\sigma_\eta^2$ and a mean signal power $\sigma_s^2$•, using the signals received through the MIMO channel.

In operation 440, the MMSE detector estimates the QAM symbols based on the signals received through the MIMO channel. The estimating of the QAM symbols may include, for example, detecting the QAM symbols. Operation 440 will be further described below with reference to FIG. 5.

In operation 445, a QAM demodulator demodulates the QAM symbols estimated by the MMSE detector, and estimates a first posterior probability of each of encoded bits of the estimated QAM symbols.

The QAM demodulator may estimate a first posterior probability $\lambda_{n,k}$ based on $\tilde{x}_{LMS,n}$ and $\tilde{\sigma}_{LMS,n}^2$. $\tilde{x}_{LMS,n}$ and $\tilde{\sigma}_{LMS,n}^2$ may be a third mathematical expectation and a third variance, respectively, which will be described below. The third mathematical expectation and the third variance will be further described below with reference to Equation 13 and FIG. 5. The first posterior probability represented by $\lambda_{n,k}$ may be calculated by Equation 7 below.

$$\lambda_{n,k} = \ln\left\{\frac{\sum_{x: f(b_{n,k}=1)} \exp\left(-\frac{1}{\tilde{\sigma}_{LMS,n}^2}|\tilde{x}_{LMS,n} - x(b_{n,1}, b_{n,2}, \ldots, b_{n,K})|^2\right) \prod_{t=1}^{K} Pr(b_{n,t})}{\sum_{x: f(b_{n,k}=-1)} \exp\left(-\frac{1}{\tilde{\sigma}_{LMS,n}^2}|\tilde{x}_{LMS,n} - x(b_{n,1}, b_{n,2}, \ldots, b_{n,K})|^2\right) \prod_{t=1}^{K} Pr(b_{n,t})}\right\} \quad \text{[Equation 7]}$$

In Equation 7, $\lambda_{n,k}$ denotes the first posterior probability of a k-th encoded bit of an n-th QAM symbol. $x(b_1, \ldots b_K)$ denotes a table function with "$2^K$" conditions, and may depend on a combination of encoded bits $b_{n,k} \in \{-1;1\}$ (k=1, 2, ..., K, and n=1, 2, ..., N). $x(b_1, \ldots b_K)$ may describe a constellation of a transmitted QAM symbol. $Pr(b_{n,k})$ denotes a prior probability of the k-th encoded bit of the n-th QAM symbol that is obtained in a previous iteration cycle. K denotes a number of encoded bits in a single QAM symbol.

In operation 450, the QAM demodulator acquires a prior probability of each of the encoded bits of the received QAM symbols. For example, the QAM demodulator may acquire a first prior probability $\lambda_{n,k,pr}$.

The first prior probability $\lambda_{n,k,pr}$ may be a prior probability obtained in the previous iteration cycle, and may be received from a second module that will be described below. For example, when an initial iteration cycle is performed, the first prior probability $\lambda_{n,k,pr}$ may be defined in Equation 8 below.

$$\lambda_{n,k,pr} = \ln\left(\frac{Pr(b_{n,k}) = +1}{Pr(b_{n,k}) = -1}\right) \quad \text{[Equation 8]}$$

In an example, the first prior probability $\lambda_{n,k,pr}$ may have a value obtained by applying a natural logarithm to a value obtained by dividing a probability that the k-th encoded bit of the n-th QAM symbol is "1", by a probability that the k-th encoded bit of the n-th QAM symbol is "-1". In this example, "n" may be an integer that is greater than or equal to or greater than "1", and less than or equal to or less than "N", and k may be an integer that is greater than or equal to "1", and less than or equal to "K". Additionally, N may denote a number of the QAM symbols, and K may denote a number of bits in a QAM symbol. That is, the first prior probability $\lambda_{n,k,pr}$ may be a logarithm ratio of prior probabilities of the k-th encoded bit of the n-th QAM symbol.

In operation 455, a first module acquires soft estimates $\hat{\lambda}_{n,k}$ of the encoded bits, by removing the first prior probability $\lambda_{n,k,pr}$ from the first posterior probability $\lambda_{n,k}$ of each of the encoded bits. For example, the first module may remove prior information $P_{pr}(b_{n,k})$ for each of the encoded bits from the first posterior probability $\lambda_{n,k}$, to calculate the soft estimates $\hat{\lambda}_{n,k}$. The soft estimates $\hat{\lambda}_{n,k}$ may be defined in Equation 9 below. The first module may discriminate external information. For example, the external information may be acquired by removing the first prior probability from the first posterior probability. The acquired soft estimates, namely, the external information, may be external probabilities.

$$\hat{\lambda}_{n,k} = \lambda_{n,k} - \lambda_{n,k,pr} \quad \text{[Equation 9]}$$

In Equation 9, $\hat{\lambda}_{n,k}$ denotes soft estimates of posterior probabilities. The first prior probability $\lambda_{n,k,pr}$ in a next iteration cycle may be acquired by decoding the encoded bits or information bits based on channel code parameters. An operation of acquiring the first prior probability $\lambda_{n,k,pr}$ in the next iteration cycle will be further described below.

In operation 460, a channel decoder decodes the encoded bits based on the soft estimates $\hat{\lambda}_{n,k}$, and acquires an improved posterior probability $\hat{\lambda}_{n,k}$ of each of the encoded bits. The channel decoder may receive the encoded bits from the QAM demodulator. The improved posterior probability $\hat{\lambda}_{n,k}$ may be acquired by estimating a posterior probability of each of the encoded bits. The improved posterior probability $\hat{\lambda}_{n,k}$ may be an improved logarithm ratio of posterior probabilities of each of the encoded bits. The improved posterior probability $\hat{\lambda}_{n,k}$ may be, for example, an improved soft estimate of the soft estimates $\hat{\lambda}_{n,k}$. An output of the channel decoder may include the improved posterior probability of each of the encoded bits.

The channel decoder may decode the information bits, using the estimated posterior probability of each of the encoded bits. The channel decoder may estimate a posterior probability of each of the information bits based on parameters of a channel code. To estimate the posterior probability of each of the information bits, the channel decoder may decode the encoded bits. An improved posterior probability of each of the information bits may be, for example, an improved posterior probability of each of the encoded bits. Additionally, the channel decoder may acquire the estimated posterior probability of each of the encoded bits with improved accuracy. The channel decoder may output soft bits. The improved posterior probability $\hat{\lambda}_{n,k}$ may be soft estimates of the output soft bits.

A deinterleaver may deinterleave the encoded bits, before the encoded bits are input to the channel decoder. An interleaver may interleave the soft bits output from the channel decoder. The interleaved soft bits may be input to the second module and a remodulator.

In operation 465, the second module acquires a second prior probability $\lambda_{n,k,pr}$ based on the improved posterior probability $\hat{\lambda}_{n,k}$ of each of the encoded bits. The second module acquires the second prior probability $\lambda_{n,k,pr}$ by removing the soft estimates $\hat{\lambda}_{n,k}$ from the improved posterior probability. The second module may discriminate external information. For example, the external information may be acquired by removing the soft estimates $\hat{\lambda}_{n,k}$ from the improved posterior probability. The second prior probability, namely, the external information, may be external probabilities. The second prior probability $\lambda_{n,k,pr}$ acquired by the second module may be a first prior probability in the next iteration cycle. The second prior probability $\lambda_{n,k,pr}$ may be defined in Equation 10 below.

$$Pr(b_{n,k}) = \frac{e^{b_{n,k}\frac{\lambda_{n,k,pr}}{2}}}{e^{\frac{\lambda_{n,k,pr}}{2}} + e^{-\frac{\lambda_{n,k,pr}}{2}}},$$

$$\lambda_{n,k,pr} = \tilde{\lambda}_{n,k} - \hat{\lambda}_{n,k}$$

[Equation 10]

The second module may define an estimate of a posterior probability of each of encoded bits in the next iteration cycle, based on the second prior probability $\lambda_{n,k,pr}$. In an example, the second prior probability $\lambda_{n,k,pr}$ may be input to the QAM demodulator and the first module in the next iteration cycle. In this example, when an improved posterior probability of each of encoded bits is estimated at least one time, the first module may use the input second prior probability $\lambda_{n,k,pr}$ as a first prior probability of each of the encoded bits in the next iteration cycle, and may acquire an improved posterior probability of each of the encoded bits in the next iteration cycle.

In operation 470, the remodulator acquires a first mathematical expectation $\hat{x}_n$ and a first variance $\sigma_n^2$, based on the improved posterior probability $\tilde{\lambda}_{n,k}$ of each of the encoded bits. The first mathematical expectation $\hat{x}_n$ may be acquired, by acquiring a weighted sum of values of an QAM constellation. The first mathematical expectation $\hat{x}_n$ may be, for example, a mathematical expectation of a symbol vector of an QAM symbol input to the remodulator. The improved posterior probability of each of the encoded bits is output from the channel decoder. The first mathematical expectation $\hat{x}_n$ may be defined in Equation 11 below.

$$\hat{x}_n = \sum_{b_{n,1},b_{n,2},\ldots b_{n,K}\in\{-1;1\}} x(b_{n,1}, b_{n,2}, \ldots, b_{n,K})$$

$$\tilde{P}(b_{n,1}, b_{n,2}, \ldots, b_{n,K})$$

[Equation 11]

In Equation 11, $\tilde{P}(b_{n,1}, b_{n,2}, \ldots, b_{n,K})$ denotes weights. $\tilde{P}(b_{n,1}, b_{n,2}, \ldots, b_{n,K})$ may be defined in Equation 12 below. $\tilde{P}(b_{n,1}, b_{n,2}, \ldots, b_{n,K})$ may be defined by the improved posterior probability of each of the encoded bits.

$$\tilde{P}(b_{n,1}, b_{n,2}, \ldots, b_{n,K}) = \prod_{k=1}^{K} \frac{e^{b_{n,k}\frac{\tilde{\lambda}_{n,k}}{2}}}{e^{\frac{\tilde{\lambda}_{n,k}}{2}} + e^{-\frac{\tilde{\lambda}_{n,k}}{2}}}$$

[Equation 12]

The first variance $\sigma_n^2$ may be defined in Equation 13 below.

$$\sigma_n^2 = \sum_{b_{n,1},b_{n,2},\ldots b_{n,K}\in\{-1;1\}} |x(b_{n,1}, b_{n,2}, \ldots, b_{n,K})|^2$$

$$\tilde{P}(b_{n,1}, b_{n,2}, \ldots, b_{n,K}) - |\hat{x}_n|^2$$

[Equation 13]

A third module of the communication apparatus may output prior information to an auxiliary input of the MMSE detector. The prior information output from the third module may be needed to generate new estimates of posterior probabilities of encoded bits and information bits to be used in the next iteration cycle. The prior information output from the third module may include, for example, a second mathematical expectation $\tilde{x}_{pr,n}$ and a second variance $\tilde{\sigma}_{pr,n}^2$ that will be described below.

In operation 475, the third module compares the first variance $\sigma_n^2$ with a third variance $\tilde{\sigma}_{LMS,n}^2$ acquired after estimation of QAM symbols of the previous iteration cycle. Based on a result of the comparing, the third module may correct the prior information input to the MMSE detector. A third mathematical expectation $\tilde{x}_{LMS,n}$ may be acquired after the estimation of the QAM symbols of the previous iteration cycle.

In an example in which the first variance $\sigma_n^2$ is less than the third variance $\tilde{\sigma}_{LMS,n}^2$, the third module may acquire the second mathematical expectation $\tilde{x}_{pr,n}$ and the second variance $\tilde{\sigma}_{pr,n}^2$, by performing a correction of Equation 14.

$$\tilde{x}_{pr,n} = -\frac{\sigma_n^2}{\tilde{\sigma}_{LMS,n}^2 - \sigma_n^2}\tilde{x}_{LMS,n} + \frac{\tilde{\sigma}_{LMS,n}^2}{\tilde{\sigma}_{LMS,n}^2 - \sigma_n^2}\hat{x}_n$$

$$\tilde{\sigma}_{pr,n}^2 = \frac{\sigma_n^2 \tilde{\sigma}_{LMS,n}^2}{\tilde{\sigma}_{LMS,n}^2 - \sigma_n^2}$$

[Equation 14]

For example, the third module may acquire the second mathematical expectation $\tilde{x}_{pr,n}$ based on the first mathematical expectation $\hat{x}_n$, the first variance $\sigma_n^2$, the third mathematical expectation $\tilde{x}_{LMS,n}$, and the third variance $\tilde{\sigma}_{LMS,n}^2$. Additionally, the third module may acquire the second variance $\tilde{\sigma}_{pr,n}^2$ based on the first variance $\sigma_n^2$ and the third variance $\tilde{\sigma}_{pr,n}^2$.

In another example in which the first variance $\sigma_n^2$ is greater than or equal to the third variance $\tilde{\sigma}_{LMS,n}^2$, the third module may acquire the second mathematical expectation $\tilde{x}_{pr,n}$ and second variance $\tilde{\sigma}_{pr,n}^2$, by performing a correction of Equation 15.

$$\tilde{x}_{pr,n} = \overline{x}_{pr,n}$$

$$\tilde{\sigma}_{pr,n}^2 = \overline{\sigma}_{pr,n}^2$$

[Equation 15]

In Equation 15, $\overline{x}_{pr,n}$ and $\overline{\sigma}_{pr,n}^2$ denote a second mathematical expectation and a second variance, respectively, which are acquired in the previous iteration cycle. In other words, the second mathematical expectation $\overline{x}_{pr,n}$ and the second variance $\overline{\sigma}_{pr,n}^2$ that are acquired in the previous iteration cycle may be identical to the second mathematical expectation $\tilde{x}_{pr,n}$ and the second variance $\tilde{\sigma}_{pr,n}^2$, respectively, which are acquired in a current iteration cycle.

In operation 480, the third module generates new input parameters of the MMSE detector, based on a result of operation 475. The third module may generate the new input parameters for estimation of QAM symbols in the next iteration cycle, based on the result of operation 475. The new input parameters generated by the third module may include the second mathematical expectation $\tilde{x}_{pr,n}$ and the second variance $\tilde{\sigma}_{pr,n}^2$.

The new input parameters may include new mathematical expectations $\tilde{X}_{pr}$ and a new prior diagonal correlation matrix $\tilde{V}_{pr}$. The new mathematical expectations $\tilde{X}_{pr}$ may be generated based on the second mathematical expectation $\tilde{x}_{pr,n}$. The new prior diagonal correlation matrix $\tilde{V}_{pr}$ may be generated based on the second variance $\tilde{\sigma}_{pr,n}^2$. For example, the second mathematical expectation $\tilde{x}_{pr,n}$ and the second variance $\tilde{\sigma}_{pr,n}^2$ for all "n" may be used as vectors to generate the new mathematical expectations $\tilde{X}_{pr}$ and the new prior diagonal correlation matrix $\tilde{V}_{pr}$, respectively. In this example, "n" may be an integer that is greater than or equal to "1" and less than or equal to "N". The new mathematical expectations $\tilde{X}_{pr}$ may be a matrix including vectors of prior mathematical expectations $\tilde{x}_{pr,n}$ for all "n", and the new prior diagonal correlation matrix $\tilde{V}_{pr}$ may be a matrix including vectors of prior variances $\tilde{\sigma}_{pr,n}^2$ for all "n".

The second mathematical expectation $\tilde{x}_{pr,n}$ and the second variance $\tilde{\sigma}_{pr,n}^2$ may be used, as prior information, to estimate QAM symbols in the next iteration cycle. The MMSE detector may acquire the third mathematical expectation $\tilde{x}_{LMS,n}$ and the third variance $\tilde{\sigma}_{LMS,n}^2$ based on the second mathematical expectation $\tilde{x}_{pr,n}$ and the second variance $\tilde{\sigma}_{pr,n}^2$, as prior information, and may estimate QAM symbols. The estimating of QAM symbols will be further described with reference to FIG. 5.

In operation 485, a hard-decision estimator forms a sequence of hard estimates of information bits, based on the improved posterior probability $\tilde{\lambda}_{n,k}$ acquired by the channel decoder. The formed sequence may be output data. Operation 480 may be performed after all iteration cycles are completed, and the sequence of the hard estimates that is formed by the hard-decision estimator may be, for example, a final sequence of the hard estimates of the information bits. By forming the final sequence, the hard-decision estimator may restore original data. An estimate of a posterior probability of each of the information bits may exist in a main output of the channel decoder.

The above-described method of FIG. 4 may be used in a communication apparatus with a MIMO channel. The transmission apparatus with the MIMO channel, and the reception apparatus with the MIMO channel, have been described above with reference to FIGS. 1 through 3, and the method of FIG. 4 may be applied to the transmission apparatus and the reception apparatus.

Figure 5:
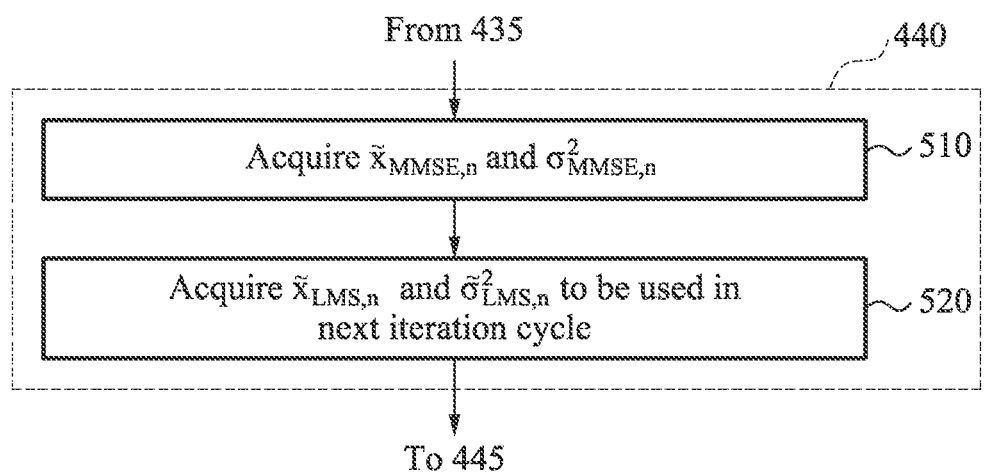
FIG. 5 is a flowchart illustrating an example of an operation of estimating quadrature amplitude modulation (QAM) symbols in the method of FIG. 4.

FIG. 5 illustrates an example of operation 440 of estimating QAM symbols in the method of FIG. 4. Operation 440 of FIG. 4 will be further described with reference to FIG. 5. The MMSE detector estimates QAM symbols through operations 510 and 520 of FIG. 5 that will be described below. Operation 440 may include operations 510 and 520.

In operation 510, the MMSE detector acquires an MMSE estimation mathematical expectation $\tilde{x}_{MMSE,n}$ and an MMSE estimation variance $\sigma_{MMSE,n}^2$ of a symbol vector of QAM symbols received at the MMSE detector, by applying an MMSE linear filter to the symbol vector. The MMSE linear filter may be defined in Equation 16 below.

$$G_{MMSE} = V_{pr}H'\left(HV_{pr}H' + \frac{\sigma_\eta^2}{\sigma_s^2}I\right)^{-1} \quad \text{[Equation 16]}$$

In Equation 16, $V_{pr}$ denotes a diagonal matrix. $V_{pr}$ may describe a prior variance of QAM symbols that are normalized by the mean signal power $\sigma_s^2 \bullet$ and transmitted.

By the MMSE linear filter, an MMSE estimation vector $\tilde{X}_{MMSE}$ may be defined in Equation 17 below.

$$\tilde{X}_{MMSE} = \bar{X}_{pr} + G_{MMSE}(Y - H\bar{X}_{pr}) \quad \text{[Equation 17]}$$

In Equation 17, $\bar{X}_{pr}$ denotes an N-dimensional vector of transmitted QAM symbols. $\bar{X}_{pr}$ may be an N-dimensional vector of prior mathematical expectations of the transmitted QAM symbols. For each component $\tilde{x}_{MMSE,n}$ (n=1, 2, ..., N) of the MMSE estimation vector $\tilde{X}_{MMSE}$, the MMSE estimation variance $\sigma_{MMSE,n}^2$ may be acquired. $\tilde{x}_{MMSE,n}$ may be an MMSE estimation mathematical expectation of a symbol vector of each of QAM symbols. $\sigma_{MMSE,n}^2$ may be a variance of an MMSE estimation error. $\sigma_{MMSE,n}^2$ may be identical to corresponding diagonal elements of a correlation matrix $V_{MMSE}$. The correlation matrix $V_{MMSE}$ may be defined in Equation 18 below.

$$V_{MMSE} = V_{pr} - G_{MMSE}HV_{pr} \quad \text{[Equation 18]}$$

In operation 520, the MMSE detector acquires the third mathematical expectation $\tilde{x}_{LMS,n}$ and the third variance $\tilde{\sigma}_{LMS,n}^2$ to be used in the next iteration cycle. The MMSE detector may perform linear transformation of an n-th component $\tilde{x}_{MMSE,n}$ of the MMSE estimation vector $\tilde{X}_{MMSE}$, and a prior mathematical expectation $\bar{x}_{pr,n}$ corresponding to the n-th component $\tilde{x}_{MMSE,n}$. "n" may be an integer that is greater than or equal to "1", and less than or equal to "N". The MMSE detector may correct the linear transformation, and may generate a new linear estimate $\tilde{x}_{LMS,n}$ of a transmitted QAM symbol, and a variance $\tilde{\sigma}_{LMS,n}^2$ of an error for the new linear estimate. The new linear estimate $\tilde{x}_{LMS,n}$ may be the third mathematical expectation $\tilde{x}_{LMS,n}$ that may be used in the next iteration cycle, and the variance $\tilde{\sigma}_{LMS,n}$ may be the third variance that may be used in the next iteration cycle.

$\tilde{x}_{LMS,n}^2$ and $\tilde{\sigma}_{LMS,n}$ may be obtained by Equation 19 below. $\tilde{x}_{LMS,n}$ and $\tilde{\sigma}_{LMS,n}^2$ may be the third mathematical expectation and the third variance, respectively.

$$\tilde{x}_{LMS,n} = \quad \text{[Equation 19]}$$

$$-\frac{\sigma_{MMSE,n}^2}{\sigma_{pr,n}^2 - \sigma_{MMSE,n}^2}\bar{x}_{pr,n} + \frac{\sigma_{pr,n}^2}{\sigma_{pr,n}^2 - \sigma_{MMSE,n}^2}\tilde{x}_{MMSE,n}$$

$$\tilde{\sigma}_{LMS,n}^2 = \frac{\sigma_{pr,n}^2 \sigma_{MMSE,n}^2}{\sigma_{pr,n}^2 - \sigma_{MMSE,n}^2}$$

In Equation 19, $\bar{x}_{pr,n}$ denotes a prior estimate of a mathematical expectation of an n-th transmitted QAM symbol, and $\sigma_{pr,n}^2$ denotes a prior estimate of a variance of the n-th transmitted QAM symbol. $\bar{x}_{pr,n}$ and $\sigma_{pr,n}^2$ may be the second mathematical expectation and the second variance, respectively, which are acquired in the previous iteration cycle and are described above with reference to FIG. 4. For example, the MMSE detector may acquire the third mathematical expectation $\tilde{x}_{LMS,n}$ to be used in the next iteration cycle, based on the second mathematical expectation $\bar{x}_{pr,n}$ in the previous iteration cycle, the second variance $\sigma_{pr,n}^2$ in the previous iteration cycle, the MMSE estimation mathematical expectation $\tilde{x}_{MMSE,n}$, and the MMSE estimation variance $\tilde{\sigma}_{MMSE,n}^2$.

Additionally, the MMSE detector may acquire the third variance $\sigma_{LMS,n}^2$ to be used in the next iteration cycle, based on the second variance $\tilde{\sigma}_{pr,n}^2$ and the MMSE estimation variance $\sigma_{MMSE,n}^2$.

When $\tilde{x}_{LMS,n}$ and $\tilde{\sigma}_{LMS,n}^2$ are acquired, a QAM symbol in the next iteration cycle may be estimated. The acquired $\tilde{x}_{LMS,n}$ and $\tilde{\sigma}_{LMS,n}^2$ may be input to the QAM demodulator in the next iteration cycle. As described above with reference to FIG. 4, the QAM demodulator may estimate the first posterior probability $\lambda_{n,k}$, based on the input $\tilde{x}_{LMS,n}$ and $\tilde{\sigma}_{LMS,n}^2$. When the third mathematical expectation $\tilde{\sigma}_{LMS,n}$ and the third variance $\tilde{\sigma}_{LMS,n}^2$ are initially acquired by the MMSE detector, the second mathematical expectation $\overline{x}_{pr,n}$ in the previous iteration cycle may be set to "0", and the second variance $\sigma_{pr,n}^2$ in the previous iteration cycle may be set to a unit variance. In other words, in an initial iteration cycle, a vector with a zero mathematical expectation and a unit variance may be used as a prior estimate of a vector of a received QAM symbol. Technical information described above with reference to FIGS. 1 through 4 may be applied without a change, and accordingly, further description is omitted herein.

Figure 6:
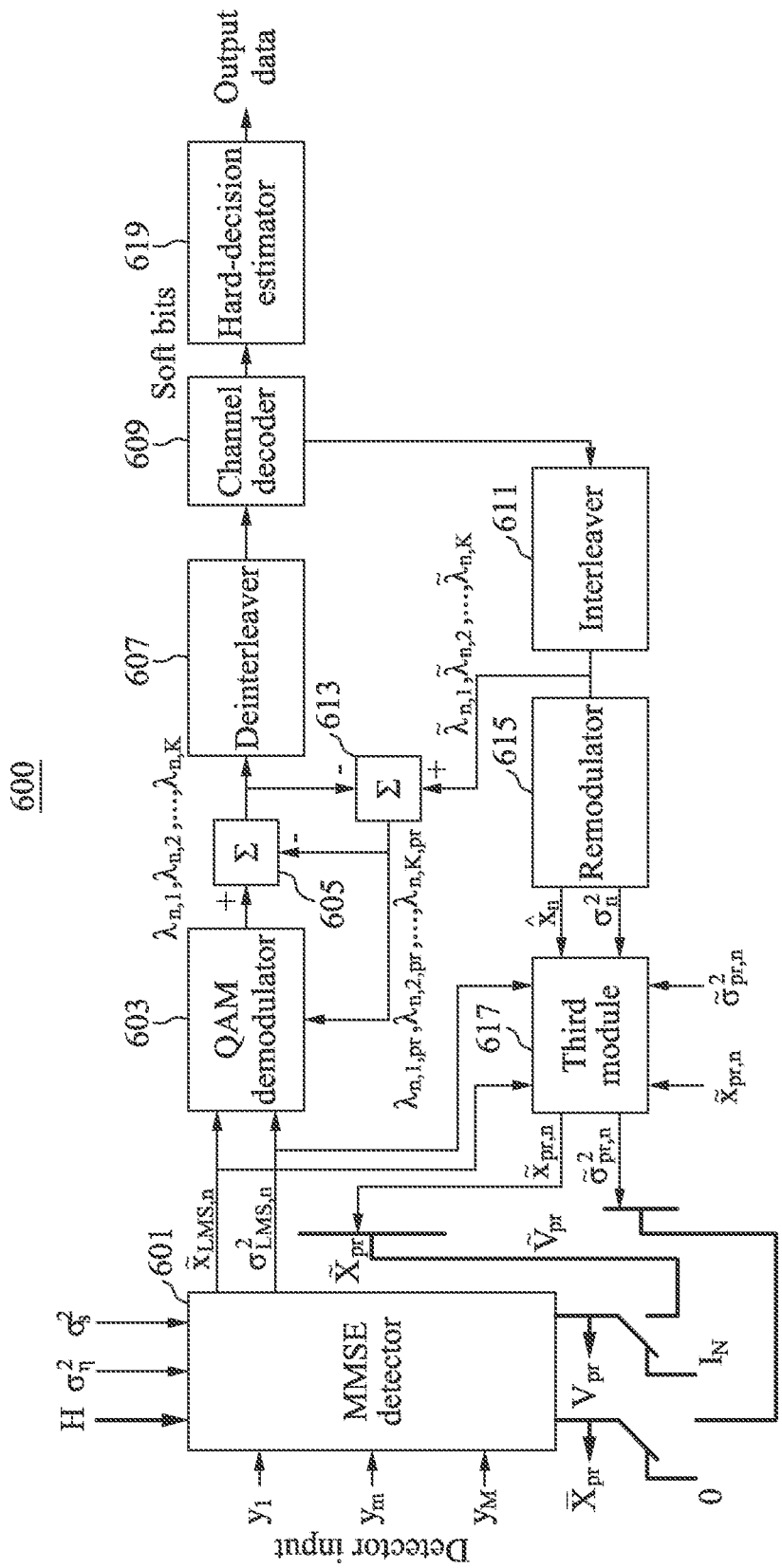
FIG. 6 is a diagram illustrating an example of a communication apparatus with a MIMO channel and configured to iteratively detect and decode a signal.

FIG. 6 illustrates an example of a communication apparatus 600 with a MIMO channel and configured to iteratively detect and decode a signal. Referring to FIG. 6, the communication apparatus 600 with the MIMO channel includes an MMSE detector 601, a QAM demodulator 603, a first module 605, a deinterleaver 607, a channel decoder 609, an interleaver 611, a second module 613, a remodulator 615, a third module 617, and a hard-decision estimator 619.

Elements with the same names, which are described above in FIGS. 4 and 5, as the MMSE detector 601, the QAM demodulator 603, the first module 605, the deinterleaver 607, the channel decoder 609, the interleaver 611, the second module 613, the remodulator 615, the third module 617, and the hard-decision estimator 619 may be applied to the communication apparatus 600. For example, operations 410 through 485 of FIG. 4 may be performed by the communication apparatus 600.

The communication apparatus 600 may further include a plurality of receiving antennas, although not illustrated. Each of the plurality of receiving antennas may receive signals modulated by transmitted QAM symbols. The plurality of receiving antennas may perform down-conversion of the received signals, respectively. The down-conversion may be to a zero carrier frequency. The plurality of receiving antennas may generate down-converted signals through the down-conversion.

The signals received, amplified and down-converted by the plurality of receiving antennas are input to the MMSE detector 601. In FIG. 6, $y_l$, $y_m$, and $y_M$ represent the down-converted signals. The down-converted signals may be represented by Y in Equation 6. Y may denote a vector of the signals received by the plurality of receiving antennas. Additionally, H, $\sigma_n^2$ and $\sigma_s^2 \bullet$ are input to the MMSE detector 601. H denotes components of a channel matrix.

Prior information of a symbol vector of a received QAM symbol may also be input to the MMSE detector 601. The prior information includes a mathematical expectation $\overline{X}_{pr}$ and a variance $V_{pr}$ of components of the symbol vector that are received in a previous iteration. The mathematical expectation $\overline{X}_{pr}$ and variance $V_{pr}$ may be generated based on a second mathematical expectation $\tilde{x}_{pr,n}$ and a second variance $\tilde{\sigma}_{pr,n}^2$ output from the third module 617.

The MMSE detector 601 estimates received QAM symbols through operations 510 and 520 of FIG. 5. To estimate the QAM symbols, the MMSE linear filter defined by Equation 16 may be applied.

In detail, the MMSE detector 601 generates a mathematical expectation of an estimated symbol vector that is represented by $\tilde{x}_{LMS,n}$ and a variance of an error of the mathematical expectation $\tilde{x}_{LMS,n}$ that is represented by $\tilde{\sigma}_{LMS,n}^2 \cdot \tilde{x}_{LMS,n}$ and $\tilde{\sigma}_{LMS,n}^2$ may be the third mathematical expectation and the third variance that are described above with reference to FIGS. 4 and 5.

The mathematical expectation $\tilde{x}_{LMS,n}$ and variance $\tilde{\sigma}_{LMS,n}^2$ are input to the QAM demodulator 603. Additionally, $\tilde{x}_{LMS,n}$ and $\tilde{\sigma}_{LMS,n}^2$ are input to the third module 617. The third module 617 acquires the second mathematical expectation $\tilde{x}_{pr,n}$ and the second variance $\tilde{\sigma}_{pr,n}^2$, based on $\tilde{x}_{LMS,n}$ and $\tilde{\sigma}_{LMS,n}^2 \cdot \tilde{x}_{LMS,n}$ and $\tilde{\sigma}_{LMS,n}^2$ may be defined by Equation 19 that is described above.

The QAM demodulator 603 demodulates the estimated QAM symbols, and estimates a first posterior probability for each of encoded bits of the respective demodulated QAM symbols. The first posterior probability is represented by $\lambda_{n,k}$. $\lambda_{n,k}$ may be defined by Equation 7 that is described above.

Additionally, the QAM demodulator 603 acquires a first prior probability for each of the encoded bits of the respective received QAM symbols. The first prior probability $\lambda_{n,k,pr}$ are acquired from a previous iteration cycle, are received from the second module 613, and may be defined by Equation 8 that is described above.

The first module 605 removes the first prior probability $\lambda_{n,k,pr}$ of each of the encoded bits from the first posterior probability $\lambda_{n,k}$ of each of the encoded bits, to generate soft estimates $\hat{\lambda}_{n,k}$ of the encoded bits. Accordingly, external information obtained in the MMSE detector 601 may be generated.

The deinterleaver 607 deinterleaves the encoded bits, before the encoded bits are input to the channel decoder 609.

The channel decoder 609 performs the above-described decoding in accordance with channel code parameters. The channel decoder 609 may use a plurality of decoding methods, for example, a Viterbi method, a maximum posterior probability (MAP) method, a turbo-decoding method, a believe propagation method, and/or other decoding methods known to one of ordinary skill in the art. To estimate a posterior probability, a MAP decoder and/or a Log-MAP decoder may be used. The decoding scheme may be selected by at least one factor, for example, a type of a used code and/or an efficiency of applied algorithms. The efficiency may be in proportion to a noise immunity at an acceptable implementation complexity.

The selected decoding method in the above-described examples may not be essential. For example, various decoding methods enabling a predetermined estimation to be more accurately performed may be applied. The predetermined estimation may include, for example, an estimation of a probability of information and/or an estimation of a probability of encoded bits.

The channel decoder 609 generates an estimate of a posterior probability of each of information bits. The channel decoder 609 performs the decoding, and estimates a probability of each of the encoded bits based on the posterior probability of each of the information bits. Estimation of posterior information of the encoded bits after the decoding may be completed using an alternative way, namely, re-encoding.

The channel decoder 609 acquires an improved posterior probability of each of the encoded bits. For example, the channel decoder 609 may decode the encoded bits based on the soft estimates $\hat{\lambda}_{n,k}$ of the encoded bits, and may acquire the improved posterior probability $\tilde{\lambda}_{n,k}$ of each of the encoded bits. A first output of the channel decoder 609 includes the acquired improved posterior probability $\tilde{\lambda}_{n,k}$, which may be called soft bits. The first output may include, for example, improved soft estimates of the encoded bits.

The interleaver 611 interleaves the soft bits included in the first output. The improved posterior probability $\tilde{\lambda}_{n,k}$ of each of the encoded bits in the first output is input to the second module 613. The second module 613 acquires predetermined information based on the improved posterior probability $\tilde{\lambda}_{n,k}$ and the soft estimates $\hat{\lambda}_{n,k}$. The acquired predetermined information includes the second prior probability $\lambda_{n,k,pr}$. The second prior probability $\lambda_{n,k,pr}$ is input to the QAM demodulator 603 and the first module 605. In an example in which the improved posterior probability is estimated at least one time, the first module 605 uses the input second prior probability as a first prior probability. The second prior probability $\lambda_{n,k,pr}$ input to the QAM demodulator 603 is used by the QAM demodulator 603 in a next iteration cycle.

The first output passing through the interleaver 611 is also input to the remodulator 615. The remodulator 615 estimates a vector of the received QAM symbol based on the improved posterior probability $\tilde{\lambda}_{n,k}$. The remodulator 615 acquires a first mathematical expectation $\hat{x}_n$ and a first variance $\sigma_n^2$ of QAM symbols. The first mathematical expectation $\hat{x}_n$ and first variance $\sigma_n^2$ may be defined by Equations 11 through 13. $\hat{x}_n$ may denote a mathematical expectation of each vector of the QAM symbols, and $\sigma_n^2$ may denote a variance of an error of $\hat{x}_n$.

The first mathematical expectation $\hat{x}_n$ and first variance $\sigma_n^2$ are input to the third module 617. The third module 617 corrects prior information. The third module 617 receives estimates of a vector of a QAM symbol obtained by the MMSE detector 601 in the previous iteration cycle. That is, the third module 617 receives $\tilde{x}_{LMS,n}$ and $\tilde{\sigma}_{LMS,n}^2$ of the previous iteration cycle from the MMSE detector 601. The third module 617 compares the first variance $\sigma_n^2$ with $\tilde{\sigma}_{LMS,n}^2$ of the previous iteration cycle. The third module 617 generates new input parameters of the MMSE detector 601 based on a result of the comparing. The generated input parameters includes the second mathematical expectation $\tilde{x}_{pr,n}$ and second variance $\tilde{\sigma}_{pr,n}^2$.

The third module 617 corrects the vector of the QAM symbol, and outputs a prior estimate. The prior estimate includes $\tilde{x}_{pr,n}$ and $\tilde{\sigma}_{LMS,n}^2$. The MMSE detector 601 may use the output prior estimate as prior information, namely a prior estimate, in the next iteration cycle.

A second output of the channel decoder 609 includes the improved soft estimates of the encoded bits. The improved soft estimates are called the soft bits. The soft bits are input to the hard-decision estimator 619. The hard-decision estimator 619 performs hard estimation of the soft bits. The hard-decision estimator 619 may form a sequence of hard estimates of information bits, as output data, based on the improved posterior probability acquired by the channel decoder 609. When iteration cycles are performed a plurality of number of times, the second output may be input to the hard-decision estimator 619. For example, a final sequence may be formed by the hard-decision estimator 619. By forming the final sequence, the hard-decision estimator 619 may restore original data.

By performing iteration cycles a plurality of number of times, reliability of data received at the communication apparatus 600 may be enhanced. For example, when iteration cycles are performed a plurality of number of times, a final hard estimate of each of information bits may be matched to a transmitted sequence with a further enhanced probability.

In a process of iteratively decoding and detecting a received signal, transformation of digital representation of the process may be described with reference to Equations 1 through 19 that are described above.

In the above-described examples, channel decoding may be fulfilled by iteration of at least one cycle. A single external iteration cycle may include joint detection and decoding. The joint detection and decoding may include at least one internal cycle of an operation of the channel decoder 609.

Additionally, in the above-described examples, a bit interleaving procedure may be applied after channel encoding during initial signal generation. For example, QAM symbols of encoded bits that are interleaved may be demodulated by the QAM demodulator 603. A bit interleaving procedure by the interleaver 611 may be applied after channel decoding performed by the channel decoder 609 during receiving of a sequence of probability estimates of demodulated bits. The sequence of the probability estimates of the demodulated bits may be deinterleaved by passing through the deinterleaver 607, prior to inputting to the channel decoder 609. A sequence of probability estimates of encoded bits after decoding performed by the channel decoder 609, may be used in a feedback line. The sequence of the probability estimates of the encoded bits may be interleaved by passing through the interleaver 611 by turn. An interleaving procedure may be performed to generate prior estimates. The sequence passing through the interleaver 611 may be input to the MMSE detector 601 and the QAM demodulator 603 in the next iteration cycle.

Encoded bits may be divided into systematic bits and parity check bits during initial signal generation. Accordingly, a sequence of estimates of probabilities of bits generated by a decoding procedure by the channel decoder 409 may include only systematic bits. The remodulator 615 may process a re-encoding procedure of a sequence of estimates of probabilities of systematic bits after decoding. By the re-encoding procedure, the remodulator 615 may add parity check bits to estimates, and may restore a full sequence of encoded bits. The restored full sequence may be used by the MMSE detector 601 and the QAM demodulator 603 in the next iteration cycle.

In the re-encoding procedure, probabilities of verifying bits may be estimated, based on probabilities of systematic bits and in accordance with parameters of a channel code. The verifying bits may be parity check bits. The re-encoding procedure performed by the remodulator 615 may include adding, to estimates, values of a probability of parity check bits characterized by zero LLR.

Figure 7:
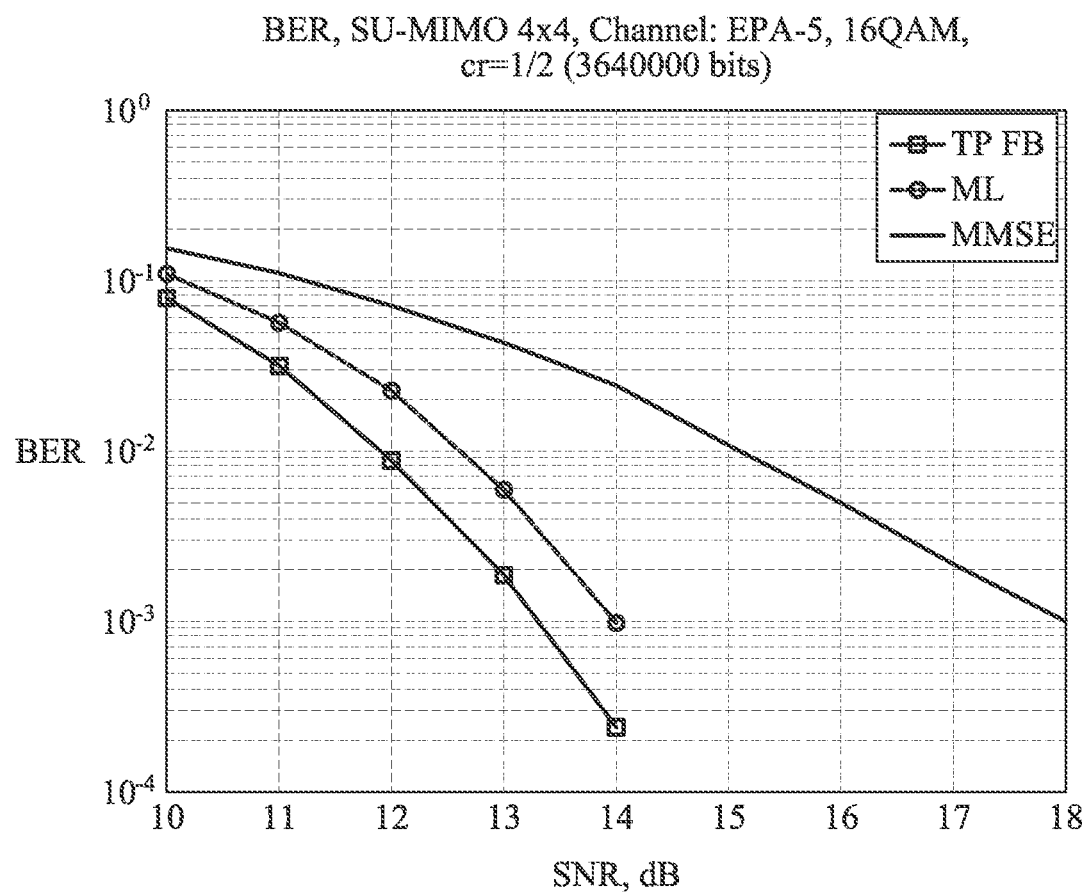
FIG. 7 is a diagram illustrating an example of results of iterative detection and decoding of a signal.

FIG. 7 illustrates an example of results of iterative detection and decoding of a signal. The results of FIG. 7 may be obtained based on a long term evolution (LTE) standard model. In FIG. 7, a MIMO configuration of "4×4", 16 QAM, and a channel of EPA-5 are used. Additionally, a code rate is set to "½", namely, 3,640,000 bits. In a graph of FIG. 7, an x-axis represents a signal-to-noise ratio (SNR) in decibels (dB), and a y-axis represents a BER performance.

The results of iterative detection and decoding are illustrated in FIG. 7. In FIG. 7, "MMSE" represents a result obtained by detecting and decoding a signal, using an MMSE detector as a MIMO detector, and "ML" represents a result obtained by detecting and decoding a signal, using an ML detector as a MIMO detector. Additionally, "TP FB" represents a result obtained by detecting and decoding a signal, using an iterative detection and demodulating unit according to the above-described examples. As illustrated in the graph of FIG. 7, a method and an apparatus according to the above-described examples may have a significantly better effect than a method or an apparatus with the MMSE detector.

Figure 8:
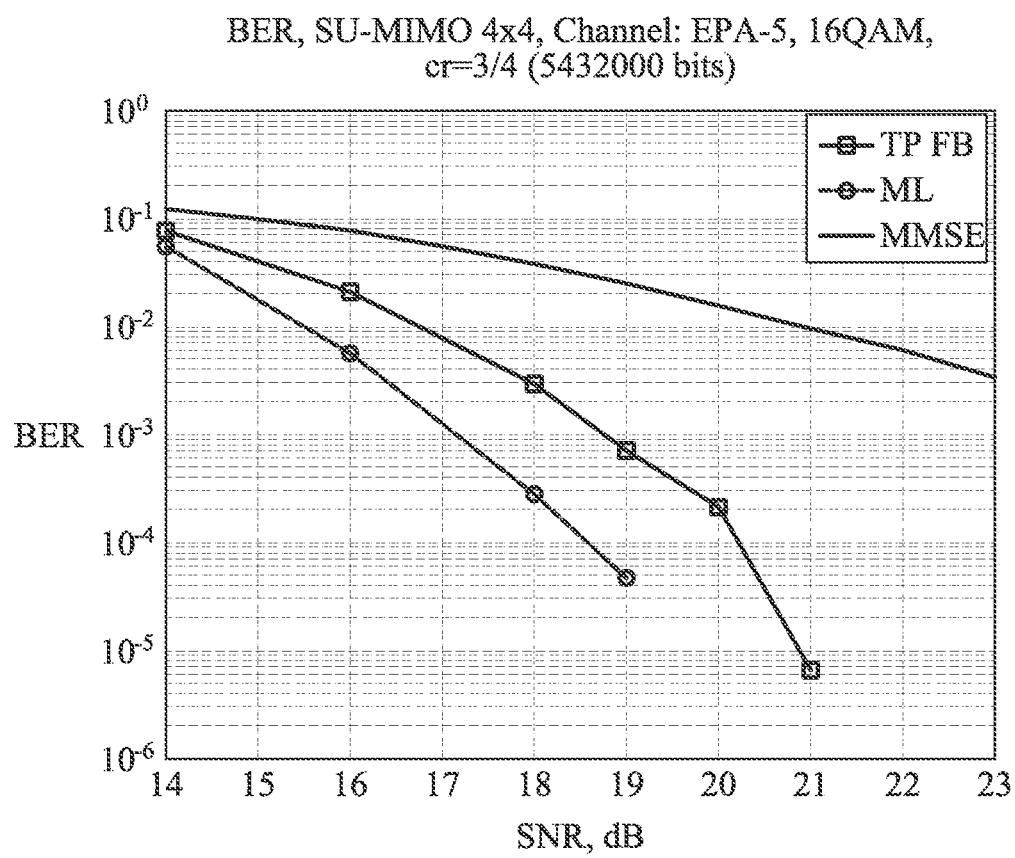
FIG. 8 is a diagram illustrating another example of results of iterative detection and decoding of a signal.

FIG. 8 illustrates another example of results of iterative detection and decoding of a signal. The results of FIG. 8 may be obtained based on an LTE standard model. In FIG. 8, a MIMO configuration of "4×4", 16 QAM, and a channel of EPA-5 are used. Additionally, a code rate is set to "¾", namely, 5,432,000 bits. In a graph of FIG. 8, an x-axis represents an SNR in dB, and a y-axis represents a BER performance.

The results of iterative detection and decoding are illustrated in FIG. 8. In FIG. 8, "MMSE" represents a result obtained by detecting and decoding a signal, using an MMSE detector as a MIMO detector, and "ML" represents a result obtained by detecting and decoding a signal, using an ML detector as a MIMO detector. Additionally, "TP FB" represents a result obtained by detecting and decoding a signal, using an iterative detection and demodulating unit according to the above-described examples. As illustrated in the graph of FIG. 8, a method and an apparatus according to the above-described examples may have a significantly better effect than a method or an apparatus with the MMSE detector.

In joint iterative detection and decoding, only two external cycles of iterative detection and decoding may be used while a channel decoder fulfills decoding using internal iterative cycles. In decoding using internal cycles, a turbo code may be decoded. Accordingly, after a first cycle of an operation of the MMSE detector, a channel decoder may perform two internal cycles of decoding. When the first cycle is completed, another cycle of detection may be performed using prior information obtained from the channel decoder. When a second cycle is completed, the channel decoder may further perform four internal cycles of decoding. Accordingly, a total number of internal cycles of an operation of the channel decoder may be six. The same number of cycles of the operation of the channel decoder may be used in conventional schemes of consequent detecting and decoding. In other words, a complexity and delay may increase only due to an additional cycle of a MIMO detection. The above increase in the complexity and delay may be insignificant in view of a comparative simplicity of a MIMO detection method based on an MMSE filtration.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication apparatus with a multiple-input and multiple-output (MIMO) channel, the communication apparatus comprising:
   a minimum mean square error (MMSE) detector configured to estimate quadrature amplitude modulation (QAM) symbols based on signals received through the MIMO channel;
   a QAM demodulator configured to demodulate the estimated QAM symbols, and estimate a first posterior probability of each of encoded bits of the estimated QAM symbols;
   a first module configured to remove a first prior probability of each of the encoded bits from the first posterior probability to generate soft estimates of the encoded bits;
   a channel decoder configured to decode the encoded bits based on the soft estimates, and generate an improved posterior probability of each of the encoded bits;
   a second module configured to generate a second prior probability of each of the encoded bits based on the improved posterior probability, the second prior probability being a first prior probability of each of encoded bits of QAM symbols in a next iteration cycle;
   a hard-decision estimator configured to generate a sequence of hard estimates of information bits based on the improved posterior probability;
   a remodulator configured to generate a first mathematical expectation and a first variance of the QAM symbols based on the improved posterior probability; and
   a third module configured to compare the first variance with a third variance generated after estimation of QAM symbols in a previous iteration cycle, and generate input parameters of the MMSE detector based on a result of the comparing.

2. The communication apparatus of claim 1, wherein:
   the first posterior probability comprises a logarithm ratio of posterior probabilities of each of the encoded bits; and
   the first prior probability comprises a logarithm ratio of prior probabilities of each of the encoded bits.

3. The communication apparatus of claim 1, wherein:
   the first prior probability comprises a natural logarithm of a value obtained by dividing a probability that a k-th encoded bit in an n-th QAM symbol is 1, by a probability that the k-th encoded bit in the n-th QAM symbol is −1;
   n is an integer that is greater than or equal to 1, and less than or equal to N;
   k is an integer that is greater than or equal to 1, and less than or equal to K; and
   N denotes a number of the QAM symbols, and K denotes a number of bits in each of the QAM symbols.

4. The communication apparatus of claim 1, wherein:
   the improved posterior probability comprises a logarithm ratio of improved posterior probabilities of each of the encoded bits;
   the second module is configured to remove the soft estimates from the improved posterior probability to generate the second prior probability; and
   in response to the improved posterior probability being generated at least one time, the first module is configured to generate soft estimates of the encoded bits in the next iteration cycle based on the second prior probability as the first prior probability in the next iteration cycle.

5. The communication apparatus of claim 1, wherein:
   the input parameters comprise a second mathematical expectation and a second variance of the QAM symbols;
   a third mathematical expectation is generated after the estimation of the QAM symbols in the previous iteration cycle;
   in response to the first variance being less than the third variance, the third module is configured to generate the second mathematical expectation based on the first mathematical expectation, the first variance, the third mathematical expectation, and the third variance, and generate the second variance based on the first variance and the third variance; and
   in response to the first variance being greater than or equal to the third variance, the third module is configured to generate the second mathematical expectation and the second variance in a current iteration cycle, as a second mathematical expectation and a second variance of QAM symbols in the previous iteration cycle.

6. The communication apparatus of claim 5, wherein:
   the MMSE detector is configured to apply an MMSE linear filter to a symbol vector of the QAM symbols to generate an MMSE estimation mathematical expectation and an MMSE estimation variance of the symbol vector, generate a third mathematical expectation to be used in the next iteration cycle, based on the second mathematical expectation, the second variance, the MMSE estimation mathematical expectation, and the MMSE estimation variance, generate a third variance to be used in the next iteration cycle, based on the second variance and the MMSE estimation variance, and estimate QAM symbols in the next iteration cycle in response to the third mathematical expectation and the third variance being generated; and the third mathematical expectation and the third variance to be used in the next iteration cycle are input to the QAM demodulator in the next iteration cycle.

7. The communication apparatus of claim 6, wherein the QAM demodulator is further configured to:
estimate a first posterior probability of each of the encoded bits in the next iteration cycle based on the third mathematical expectation and the third variance to be used in the next iteration cycle.

8. The communication apparatus of claim 5, wherein, in response to the third mathematical expectation and the third variance being initially generated, the third module is configured to set the second mathematical expectation to 0, and set the second variance to a unit variance.

9. The communication apparatus of claim 1, further comprising:
a deinterleaver configured to deinterleave the encoded bits before the encoded bits are input to the channel decoder; and
an interleaver configured to interleave soft bits output from the channel decoder.

10. A method in a communication apparatus with a multiple-input and multiple-output (MIMO) channel, the method comprising:
estimating quadrature amplitude modulation (QAM) symbols based on signals received through the MIMO channel;
demodulating the estimated QAM symbols;
estimating a first posterior probability of each of encoded bits of the estimated QAM symbols;
removing a first prior probability of each of the encoded bits from the first posterior probability to generate soft estimates of the encoded bits;
decoding the encoded bits based on the soft estimates;
generating an improved posterior probability of each of the encoded bits;
generating a second prior probability of each of the encoded bits based on the improved posterior probability, the second prior probability being a first prior probability of each of encoded bits of QAM symbols in a next iteration cycle;
generating a sequence of hard estimates of information bits based on the improved posterior probability;
generating a first mathematical expectation and a first variance of the QAM symbols based on the improved posterior probability; and
comparing the first variance with a third variance generated after estimation of QAM symbols in a previous iteration cycle; and
generating input parameters for estimation of the QAM symbols in the next iteration cycle based on a result of the comparing.

11. The method of claim 10, wherein:
the first posterior probability comprises a logarithm ratio of posterior probabilities of each of the encoded bits;
the first prior probability comprises a logarithm ratio of prior probabilities of each of the encoded bits;
the improved posterior probability comprises a logarithm ratio of improved posterior probabilities of each of the encoded bits;
the generating of the second prior probability comprises removing the soft estimates from the improved posterior probability to generate the second prior probability; and
the method comprises, in response to the improved posterior probability being generated at least one time, generating soft estimates of the encoded bits in the next iteration cycle based on the second prior probability as the first prior probability in the next iteration cycle.

12. The method of claim 10, wherein:
the input parameters comprise a second mathematical expectation and a second variance of the QAM symbols;
a third mathematical expectation is generated after the estimation of the QAM symbols in the previous iteration cycle;
the generating of the input parameters comprises, in response to the first variance being less than the third variance, generating the second mathematical expectation based on the first mathematical expectation, the first variance, the third mathematical expectation, and the third variance, and generating the second variance based on the first variance and the third variance; and
the generating of the input parameters comprises, in response to the first variance being greater than or equal to the third variance, generating the second mathematical expectation and the second variance in a current iteration cycle, as a second mathematical expectation and a second variance of QAM symbols in the previous iteration cycle.

13. The method of claim 12, wherein the estimating of the QAM symbols comprises:
applying a minimum mean square error (MMSE) linear filter to a symbol vector of the QAM symbols to generate an MMSE estimation mathematical expectation and an MMSE estimation variance of the symbol vector;
generating a third mathematical expectation to be used in the next iteration cycle, based on the second mathematical expectation, the second variance, the MMSE estimation mathematical expectation, and the MMSE estimation variance;
generating a third variance to be used in the next iteration cycle, based on the second variance and the MMSE estimation variance; and
estimating QAM symbols in the next iteration cycle in response to the third mathematical expectation and the third variance being generated.

14. The method of claim 13, further comprising:
estimating a first posterior probability of each of the encoded bits in the next iteration cycle based on the third mathematical expectation and the third variance to be used in the next iteration cycle.

15. The method of claim 12, further comprising, in response to the third mathematical expectation and the third variance being initially generated:
setting the second mathematical expectation to 0, and setting the second variance to a unit variance.

16. An apparatus comprising:
a processor configured to
estimate quadrature amplitude modulation (QAM) symbols based on signals,
demodulate the estimated QAM symbols,
estimate a posterior probability of each of encoded bits of the estimated QAM symbols,
remove a prior probability of each of the encoded bits from the posterior probability to generate soft estimates of the encoded bits,
decode the encoded bits based on the soft estimates,
generate an improved posterior probability of each of the encoded bits,
generate another prior probability of each of encoded bits of QAM symbols in a next iteration cycle based on the improved posterior probability,
generate a sequence of hard estimates of information bits based on the improved posterior probability, generate a first mathematical expectation and a first variance of the QAM symbols based on the improved posterior probability, generate a second mathematical expectation and a second variance of the QAM symbols based on the first mathematical expectation, the first variance, a third mathematical expectation of QAM symbols in a previous iteration cycle, and a third variance of the QAM symbols in the previous iteration cycle, and estimate QAM symbols in the next iteration cycle based on the second mathematical expectation and the second variance.

\* \* \* \* \*